(12) United States Patent
Madej

(10) Patent No.: US 7,204,423 B2
(45) Date of Patent: Apr. 17, 2007

(54) BAR CODE SIGNAL PROCESSING

(75) Inventor: Dariusz Madej, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 178 days.

(21) Appl. No.: 11/066,829

(22) Filed: Feb. 25, 2005

(65) Prior Publication Data

US 2006/0192011 A1  Aug. 31, 2006

(51) Int. Cl.
  *G06K 7/10* (2006.01)
(52) U.S. Cl. .................. 235/462.29; 235/462.27
(58) Field of Classification Search .......... 235/462.25, 235/462.26, 462.27, 462.29, 462.22
See application file for complete search history.

(56) References Cited

U.S. PATENT DOCUMENTS 4,251,798 A    2/1981   Swartz et al.
4,360,798 A   11/1982   Swartz et al.
4,369,361 A    1/1983   Swartz et al.
4,387,297 A    6/1983   Swartz et al.
4,409,470 A   10/1983   Shepard et al.
4,460,120 A    7/1984   Shepard et al.
6,443,360 B1 *  9/2002   Marchi et al. ......... 235/462.25

* cited by examiner

*Primary Examiner*—Karl D. Frech
(74) *Attorney, Agent, or Firm*—Tarolli, Sundheim, Covell & Tummino, LLP

(57) ABSTRACT

A low pass filter that approximates a Gaussian transfer function filters the analog bar code signal prior to digitization is used to smooth the bar code signal. The Gaussian filter has a transfer function that compensates for beam distortion close in to the bar code scanner. The smoothed bar code signal is provided to the digitizer to improve the efficiency with which the bar code signal can be digitized.

29 Claims, 5 Drawing Sheets

BAR CODE SIGNAL PROCESSING

TECHNICAL FIELD

The invention relates generally to optical scanners, and in particular to scanners used for scanning optical codes such as bar code symbols.

BACKGROUND

Optical codes are patterns made up of image areas having different light reflective or light emissive properties, which are typically assembled in accordance with a priori rules. The term "bar code symbol" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which bar code scanners are one type. Optical code readers are used in both fixed or portable installations in many diverse environments such as in stores for check-out services, in manufacturing locations for work flow and inventory control, and in transport vehicles for tracking package handling. The optical code can be used as a rapid, generalized means of data entry, for example, by reading a target bar code from a printed listing of many bar codes. In some uses, the optical code reader is connected to a portable data processing device or a data collection and transmission device. Frequently, the optical code reader includes a handheld sensor that is manually directed at a target code.

Most scanning systems, or scanners, generate a beam of light which reflects off a bar code symbol so the scanning system can receive the reflected light. The system then transforms that reflected light into electrical signals, digitizes the signals into a digital bar pattern (DBP) signal, and decodes the DBP signal to extract the information embedded in the bar code symbol. Scanning systems of this type are described in U.S. Pat. Nos. 4,251,798; 4,360,798; 4,369,361; 4,387,297; 4,409,470; and 4,460,120, all of which have been assigned to Symbol Technologies, Inc.

The light beam that is directed at the bar code is focused using an aperture. One drawback to the use of an aperture to focus the beam is that the beam is distorted close in to the scanner due to light diffraction. This distortion causes the beam to have a shape with multiple maxima rather than the desired relatively smooth Gaussian shape. In addition, variances in the assembly of the optical elements of a scanner that occur due to manufacturing tolerances can also cause distortion in the outgoing scanner light beam. When a distorted light beam is convoluted with the bar code pattern at which the scanner is aimed the reflected analog bar code signal is also distorted, making decoding the signal more difficult.

SUMMARY

A low pass filter that filters the analog bar code signal prior to digitization is used to smooth the analog bar code signal. The low pass filter is configured to correct distortion in the light beam at beam positions close to the scanner nose. The smoothed bar code signal is provided to the digitizer to improve the efficiency with which the bar code signal can be digitized. The smoothing filter can approximate a Gaussian transfer function using, for example, software procedures or a digital or analog filter.

DETAILED DESCRIPTION OF PREFERRED EMBODIMENTS

Figure 4:
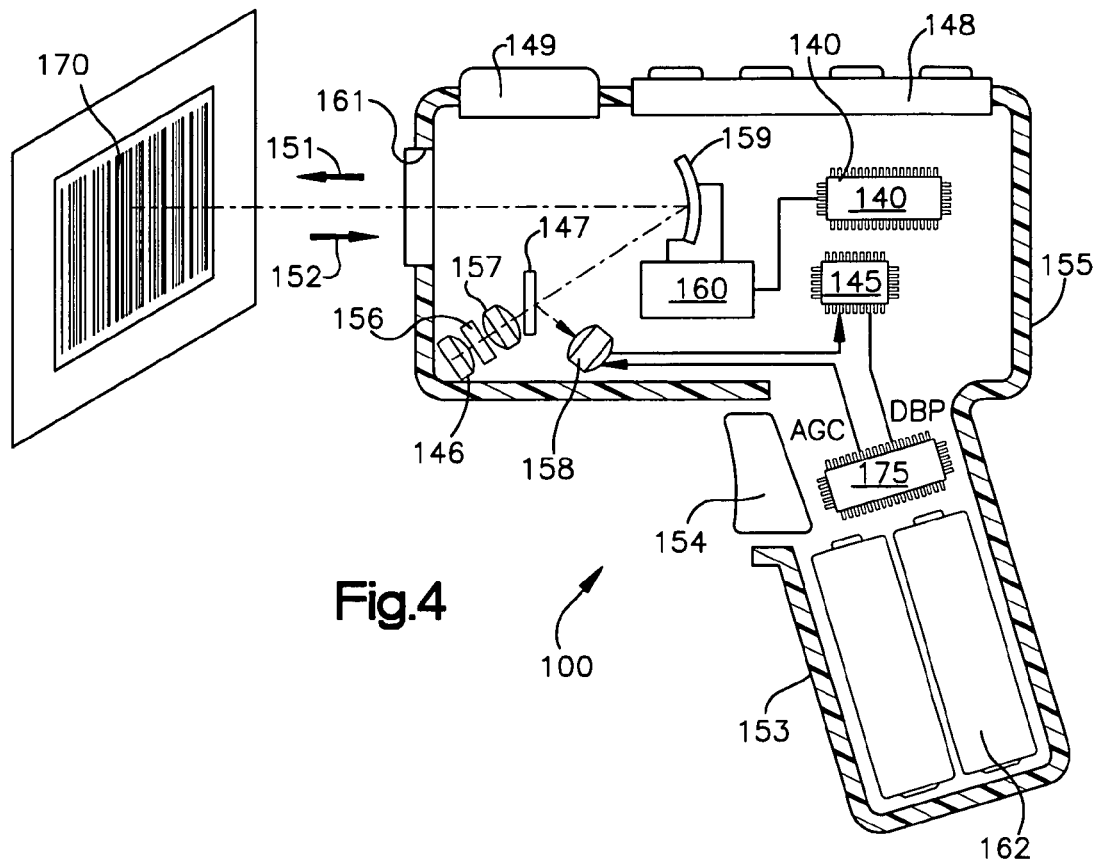
FIG. 4 is a functional overview of a scanner that incorporates one embodiment of the present invention.

FIG. 4 shows a simplified embodiment of a bar code scanner 100. While the bar code scanner depicted in FIG. 4 is a hand held device, other types of scanners may be used to practice the signal encoding technique described below. A user aims the scanner 100 at a bar code symbol 170 without physically touching it. Typically, the scanner 100 operates in a range from contact with the bar code symbol to several inches from the bar code symbol being read. Scanner 100 my be gun-shaped in a housing 155 having a pistol grip handle 153. A movable trigger 154 on handle 153 allows a user to activate a light beam 151 and associated detector circuitry when the user has pointed scanner 100 at a symbol 170.

The housing 155 contains a light source 146, an aperture 156, a lens 157, a partially-silvered mirror 147, a detector 158, an oscillating mirror 159, a motor 160, a battery 162, a CPU 140, and a digitizer circuit 145. A decoder 175 is shown removed from the scan engine but located within the housing 155. In some applications the decoder is located in a remote location such as a user terminal. The decoder 175 receives the DBP signal from the digitizer 145 on a single signal line in the described embodiment. However, any digitizer to decoder interface can be used in the practice of the present invention.

When a user activates the scanner by pulling the trigger 154, the light source 146 generates a light beam 151 along the axis of the lens 157 that travels through the aperture 156. The lens 157, which is not necessary in all embodiments, may be a single lens or a multiple lens system. After passing through the lens 157, the beam 151 passes through the partially-silvered mirror 147, and if desired, other lenses or beam shaping structures. The beam 151 then strikes oscillating mirror 159 driven by a scanning motor 160, which together direct the beam 151 in a scanning pattern as the beam exits through an exit window 161.

The light beam 152 is the light from the beam 151 that is reflected off the symbol 170. The beam 152 returns to the scanner 100 along a path parallel to, or at times coincident with, the beam 151. The beam 152 thus reflects off the mirror 159 and strikes the partially-silvered mirror 147. The mirror 147 reflects some of the beam 152 into a light-responsive detector 158 that converts the light beam 152 into analog electric signals. The electric signals then pass into the digitizer 145 and decoder 175 to be processed and decoded to extract the information represented by the bar code. The microprocessor 140 is also used to control the operation of the motor 160 to adjust the scanning pattern and provide other control.

Figure 1:
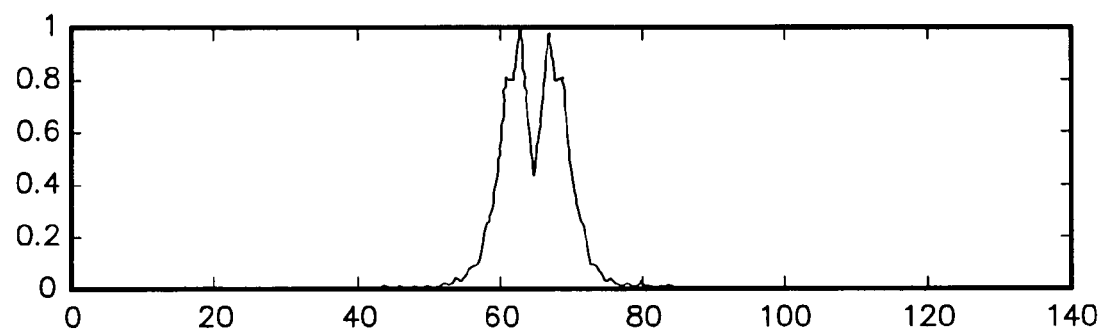
FIG. 1 is a profile of light beam intensity in a prior art bar code scanner.
Figure 2:
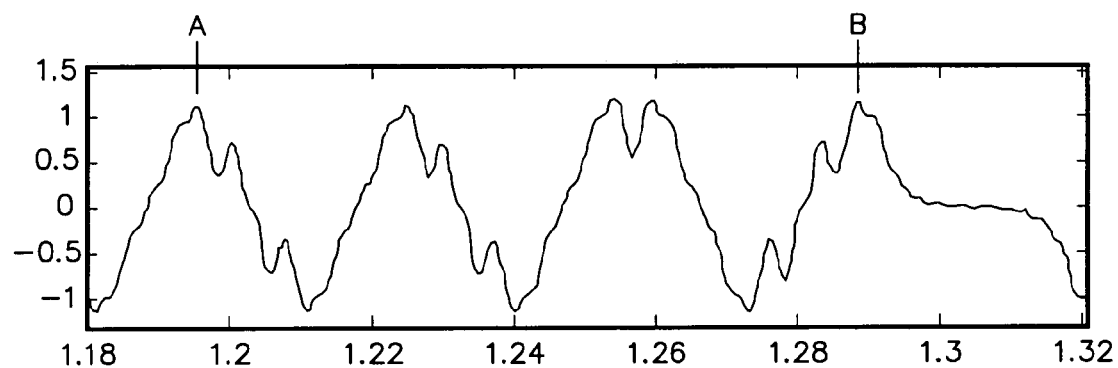
FIG. 2 is a graphical depiction of an analog bar code signal that results from the convolution of the light beam of FIG. 1 with a bar code.
Figure 3:
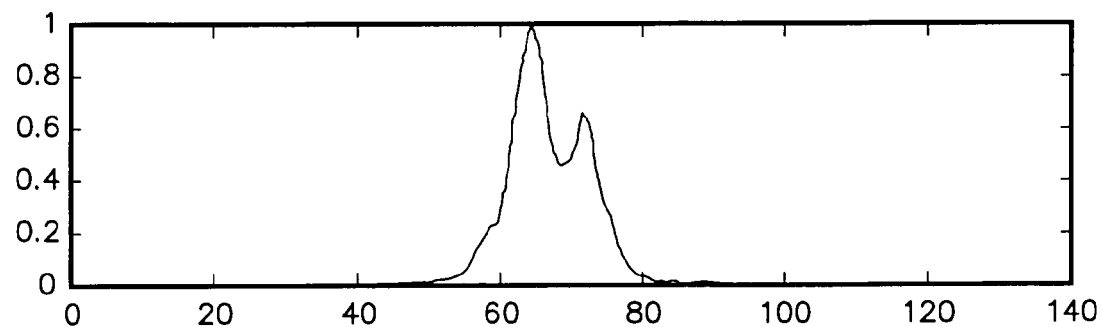
FIG. 3 is a profile of light beam intensity in a prior art bar code scanner.

The light beam 151 is focused by optical elements in the aperture 156 that is located between the light source 146 and lens 157. As discussed briefly in the Background, the use of the aperture to focus the light beam often causes distortion in the beam. Instead of having a shape in the form of a relatively smooth Gaussian function, the light beam may have a shape with two or more local maxima in the direction of the scanning beam movement, like the beam shown in FIG. 1. Another cause of beam distortion is due to tolerance stack up on optical elements during manufacturing and assembly. One such beam distortion, featuring a side lobe, is shown in FIG. 3. When a distorted beam is convoluted with the bar code pattern, it yields a bar code signal with distortions. The signal distortions pose several problems to both the digitizer and decoder. One of the problems is that false edges might be detected, which leads to splitting bar code elements into several parts. Splitting elements results in a failure to decode. Even more serious is the possibility of an edge position error, that can result in a mis-decode. Referring to the bar code pattern shown in FIG. 2, edge errors are caused by the convolution of a beam with two more peaks being convoluted with a bar code pattern to produce a signal in which some edges appear to come from the first peak (labeled A) and other edges appear to come from the last peak (labeled B). In addition to failed decodes and mis-decodes, beam profile differences cause differences in performance between scanners of the same type.

Analog Bar Code Pattern Filtering

Figure 5:
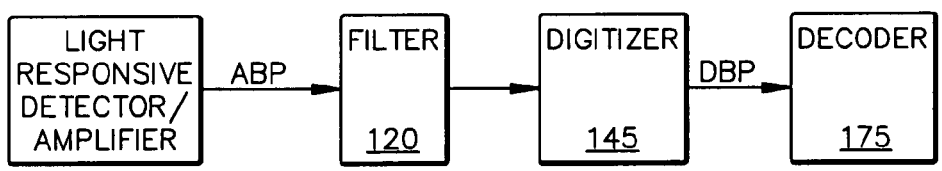
FIG. 5 is a functional block diagram of signal processing steps that are taken in accordance with one embodiment of the present invention.
Figure 6:
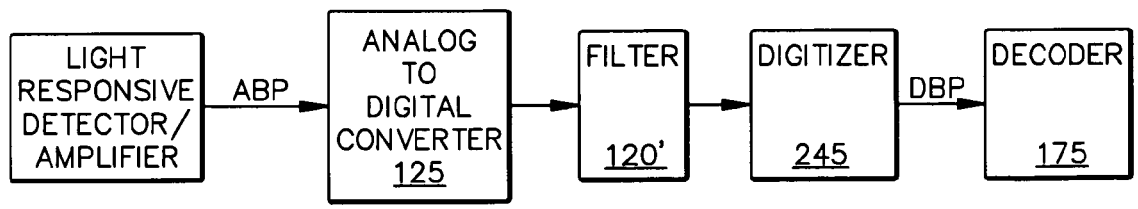
FIG. 6 is a functional block diagram of signal processing steps that are taken in accordance with another embodiment of the present invention.

To mitigate the difficulties posed by beam distortion, a smoothing filter 120 is provided that acts upon the analog bar code pattern from the light responsive detector and any associated amplifier 158 as shown in FIG. 5. The filtered analog bar code pattern is then digitized by the digitizer 145 and decoded by the decoder 175. In another embodiment shown in FIG. 6, the filtered analog signal is converted to a digital signal by an analog to digital converter 125 prior to filtering by a filter 120' and digitization by digitizer 245. Several approaches can be taken in constructing a suitable smoothing filter 120 as will be discussed below.

Figure 7:
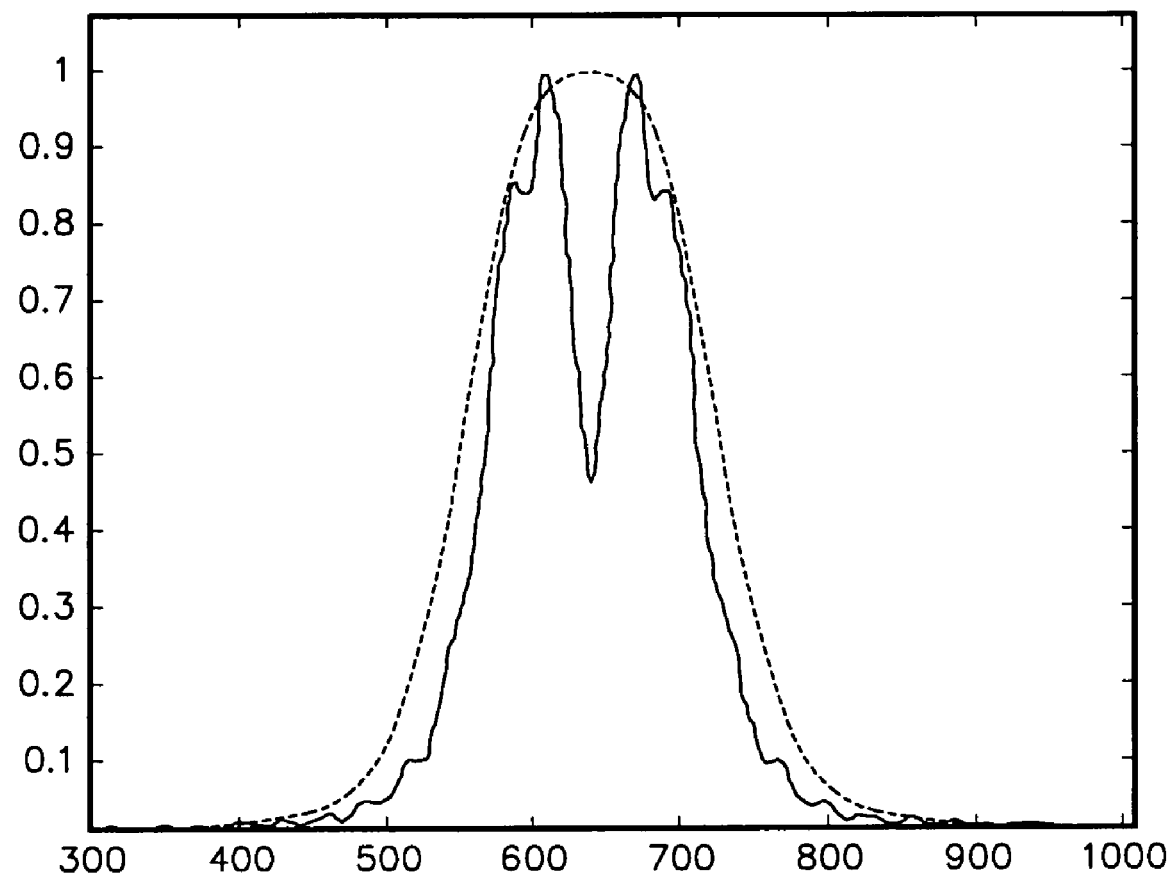
FIG. 7 is a profile of the light beam of FIG. 1 that is acted upon in accordance with one embodiment of the present invention.

In general, a smoothing filter with a Gaussian transfer function is suitable for smoothing false peaks in the analog bar code signal caused by beam distortion. A Gaussian filter does not suffer from ringing or overshooting and provides a symmetrical shape with no phase distortion. When a Gaussian transfer function is combined with a Laplacian operator it is a good edge detector and as such is especially suitable for bar code decoding. While the filter physically acts upon the analog bar code signal that is produced by the convolution of the distorted beam with the bar code pattern, conceptually the filter can be seen as shaping the light beam. The effective beam used for scanning the bar code is a result of convolution of the beam with the Gaussian transfer function of the filter. FIG. 7 shows an effective beam in dotted line that represents the regularization of a distorted beam (in solid) by convoluting it with a filter having a Gaussian transfer function. For the effective beam shown in FIG. 7, the Gaussian filter size was equal to 60% of the beam width measured at the 12.5% clip level and the Gaussian function size was assumed to be four times its standard deviation. Experiments have shown that if the size of a Gaussian is in the range of 50–60% of the width of the optical beam, the beam shape imperfections leading to double peaks are significantly reduced. The obtained smoothed beam is only about 20% wider than the original beam. The 20% increase in the beam size can contribute to some small growth of the blur level of high-density bar code signals. However, small increases in blur level are easier to compensate for during decoding than are edge distortions caused by an irregularly-shaped beam.

Figure 8:
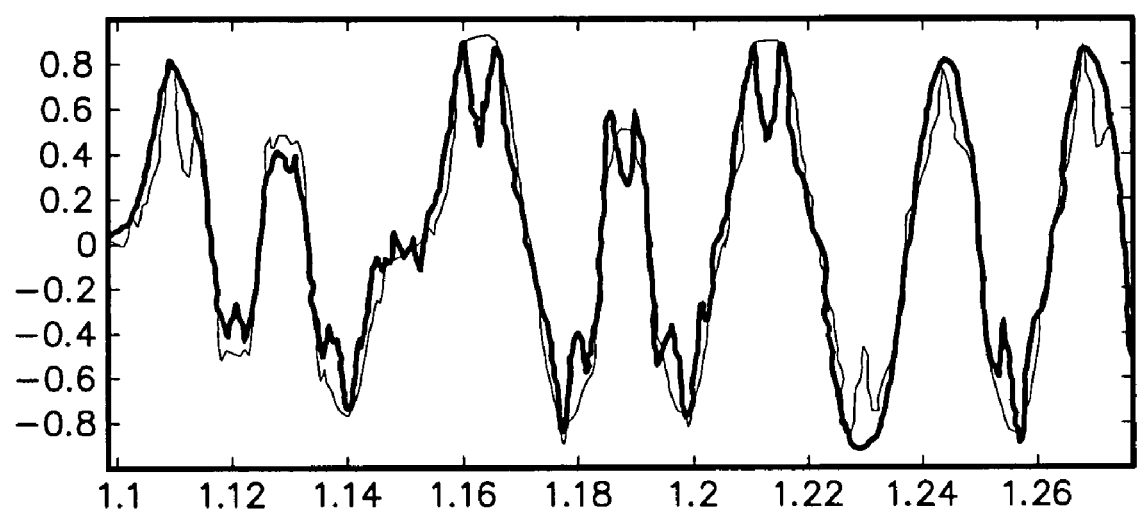
FIG. 8 is a graphical depiction of the analog bar code signal of FIG. 2 that is acted upon in accordance with one embodiment of the present invention.
Figure 9:
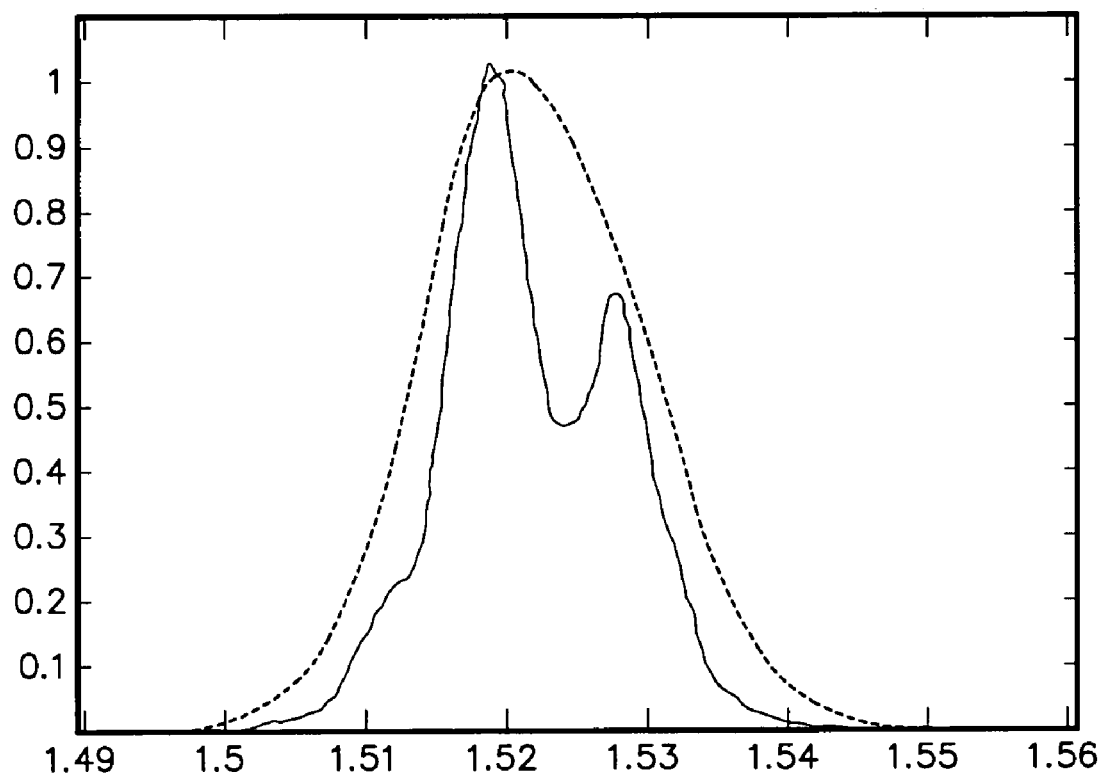
FIG. 9 is a profile of the light beam of FIG. 3 that is acted upon in accordance with one embodiment of the present invention.

In the case when the light beam splits into two pronounced peaks, smoothing becomes difficult because the frequencies of the splits of the beam are relatively low as compared to the frequency range of the Gaussian beam of the size equivalent to the beam size. If the beam is split into three or more peaks, then the peaks are closer to each other and their frequencies are higher, and can be eliminated with a smaller Gaussian, which would ensure that the width of the smoothed beam will be only marginally bigger than the size of the optical beam. Also, when the bar code density is high, and the bar code element width is smaller than the beam size, less smoothing might be needed to eliminate the double peaks because element interactions result in some level of blur and thus signal smoothing. Thus, according to one described embodiment, the smoothing filter is designed as a Gaussian function having a size corresponding to 60% of the width of the light beam measured at a distance of zero inches from the scanner nose. The design of the smoothing filter is part of the optical beam design and optimization. The performance of such a filter is shown in FIG. 8 when the scanner acts at a distance of 0.5 inches from a 10 mil UPC bar code. The Gaussian filter can also be used to make beam corrections on distortions caused by manufacturing variances like the beam shown in FIG. 3.

The Gaussian filter can be implemented as a software procedure in the scanner. The software procedure captures the entire signal waveform and processes it either using the built-in CPU or an external mobile processor. Mobile processors often utilize powerful CPUs that have signal processing capabilities like a Multiply and Accumulate operation; such as the XSCALE; or ARM processors. One limitation to implementing a Gaussian filter as a software procedure is that the computational cost of filtering is high due to the multiplication of the number of signal samples times the filter size. In order to implement such a filter efficiently, the sampling rate of the signal must be as small as possible, i.e., 10 samples per narrow element, and the bar code boundaries should be located within the bar code signal prior to filtering by some kind of margin search algorithm. For instance, in the case of a UPC bar code, $950 \times 20 = 19,000$ Multiply and Accumulate operations would need to be performed at a minimum. Such a task can be undertaken in real time by a CPU while still leaving lots of time for edge detection and decoding.

While it is impossible to design a Gaussian using FIR digital filter techniques, it is possible to approximate the Gaussian transfer function using techniques that are known in the art. Using an approximate Gaussian function with an FIR filter allows for more efficient implementation as a software procedure, cutting the amount of computation approximately five times and making implementation possible with most scanner ASCICs. An IIR filter can also be used to approximate the Gaussian transfer function.

Figure 10:
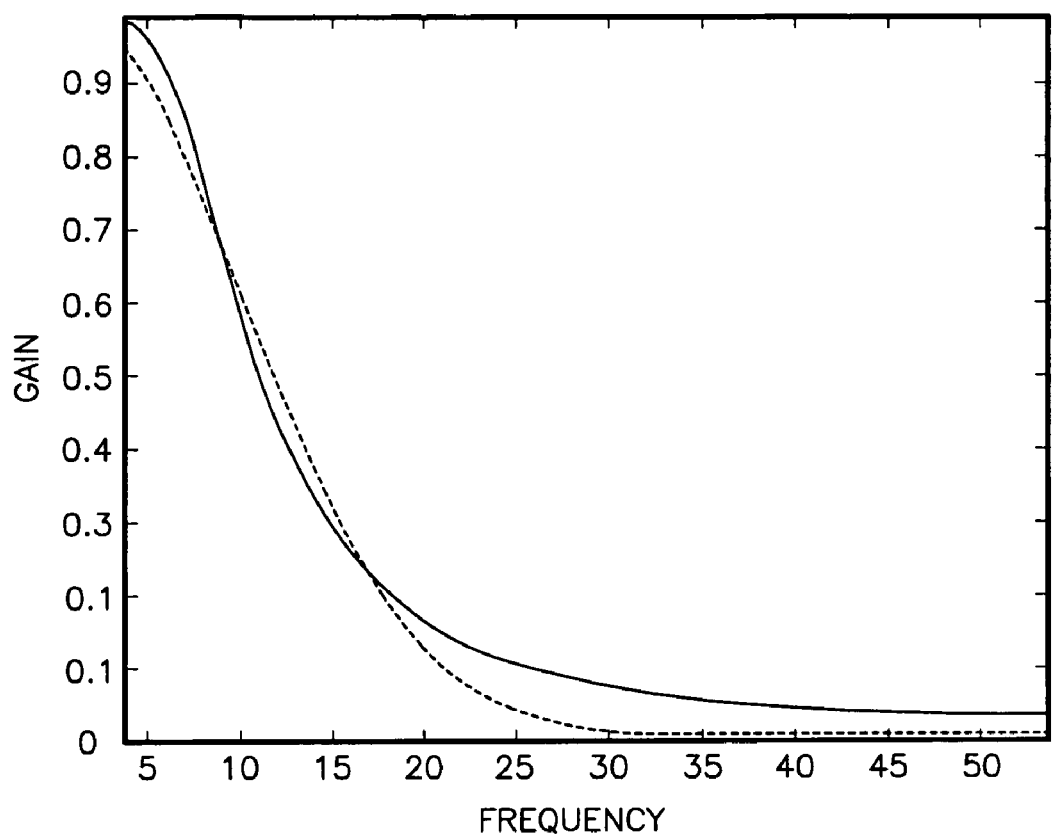
FIG. 10 is a graphical depiction of the transfer function of two filters that can be used in practice various embodiments of the present invention.

A smoothing filter can also be achieved by approximating a Gaussian filter with a Butterworth or Bessel filter. Experimental results suggest that the approximation can be achieved using the second order Butterworth filter. This filter can be implemented as an analog device and incorporated in analog ASCICs. FIG. 10 shows the comparison of the transfer functions of a second order Butterworth filter (solid line) and its Gaussian equivalent (dotted line.) For the filters shown in FIG. 7, the cut off frequency of the Gaussian filter is:

$$f_G = \frac{\sqrt{c} * s_f}{\sigma}$$

Where $s_f$ is a sampling rate and $\sigma$ is ¼ of the beam width expressed in number of samples assuming a given sampling rate is used. C is a constant equal to:

$$c = \frac{-\log_{10}\left(\frac{\sqrt{2}}{2}\right)}{2\pi^2}$$

The Butterworth filter is designed to be:

$$f_B = 1.06\frac{s_f}{8\delta}$$

Figure 11:
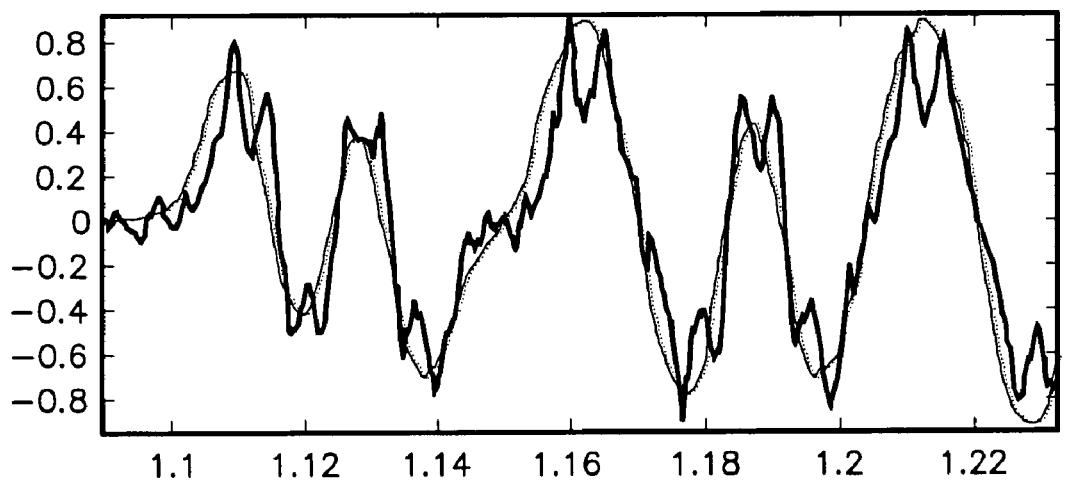
FIG. 11 is a graphical depiction of an analog bar code signal acted upon by filters having the transfer functions shown in FIG. 10.

The smoothed bar code signal that results from the Gaussian (dotted line) and Butterworth (solid line) filters is shown in FIG. 11 with a focusing distance of 0.5 inches and a 10 mil UPC bar code.

It can be seen from the foregoing description that using a filter to smooth the analog bar code signal facilitates digitization and decoding of the signal. Although the invention has been described with a certain degree of particularity, it should be understood that various changes can be made by those skilled in the art without departing from the spirit or scope of the invention as hereinafter claimed.

I claim:

1. An apparatus that acts on a printed symbol comprising:
a light source that generates a light beam that exits the apparatus through an exit window and is directed at a target surface on which a symbol may be present;
a light detector that detects light reflected back from the target surface and provides a detection signal corresponding to the timing and strength of changes in the amplitude of the reflected light; and
a smoothing filter having a generally Gaussian transfer function that compensates for light beam distortion that occurs at close distances to the exit window to smooth the detection signal, a size of the smoothing filter selected as a function of a width of the light beam.

2. The apparatus of claim 1 comprising an analog to digital converter that converts the detection signal to a digital signal which is acted on by the smoothing filter.

3. The apparatus of claim 1 wherein the filter is a low pass filter.

4. The apparatus of claim 1 wherein the filter is of a size ranging between fifty and sixty percent of the width of the light beam.

5. The apparatus of claim 1 wherein the transfer function has a size of approximately four times its standard deviation.

6. The apparatus of claim 1 wherein the filter is implemented as a software procedure that acts on samples of the detection signal.

7. The apparatus of claim 1 wherein the filter is implemented as an FIR digital filter.

8. The apparatus of claim 1 wherein the filter is implemented as an IIR digital filter.

9. The apparatus of claim 1 wherein the filter is a second order Butterworth filter.

10. The apparatus of claim 1 wherein the filter is a Bessel filter.

11. The apparatus of claim 1 wherein the filter is implemented as an analog device on an integrated circuit.

12. An apparatus that acts on a bar code comprising:
a light source that generates a light beam that exits the apparatus through an exit window and is directed at a target surface on which a bar code may be present;
a light detector that detects light reflected back from the target surface and provides a detection signal corresponding to the timing and strength of changes in the amplitude of the reflected light;
a low pass filter having a generally Gaussian transfer function with filter properties selected based on light beam characteristics that compensates for light beam distortion that occurs at close distances to the exit window to smooth the detection signal, a size of the low pass filter selected as a function of a width of the light beam;
a digitizer that translates the smoothed detection signal and outputs at least one digitizer signal representative of the timing ad strength of those changes in the detection signal that correspond to transitions between light and dark areas on the surface.

13. The apparatus of claim 12 wherein the low pass filter is of a size ranging between fifty and sixty percent of the width of the light beam and is implemented as an analog device on an integrated circuit.

14. The apparatus of claim 12 wherein the filter is implemented as a software procedure that acts on samples of the detection signal.

15. The apparatus of claim 12 wherein the filter is implemented as a digital filter.

16. A method that evaluates a printed symbol comprising:
generating a light beam to be directed through an exit window at a target surface on which a symbol may be present;
detecting light reflected back from the target surface;
providing a detection signal corresponding to the timing and strength of changes in the amplitude of the reflected light; and
smoothing the detection signal with a smoothing filter wherein the filter has a generally Gaussian transfer function that is selected to correct the shape of the light beam at distances close to the exit window, a size of the smoothing filter selected as a function of a width of the light beam.

17. The method of claim 16 comprising translating the smoothed detection signal and outputting at least one digitizer signal representative of the timing and strength of those changes in the detection signal that correspond to transitions between light and dark areas on the surface.

18. The method of claim 16 wherein the filter is a low pass filter.

19. The method of claim 16 comprising sampling the detection signal and eliminating samples from the signal according to a given transfer function to smooth the detection signal.

20. The method of claim 16 wherein the filter is of a size ranging between fifty and sixty percent of the width of the light beam.

21. The method of claim 16 wherein the transfer function has a size of approximately four times its standard deviation.

22. The method of claim 16 wherein the filter is implemented as an FIR digital filter.

23. The method of claim 16 wherein the filter is implemented as an IIR digital filter.

24. The method of claim 16 wherein the filter is a second order Butterworth filter.

25. The method of claim 16 wherein the filter is a Bessel filter.

26. The method of claim 16 wherein the filter is implemented as an analog device on an integrated circuit.

27. An apparatus that evaluates a printed symbol comprising:

means for generating a light beam to be directed through an exit window at a target surface on which a symbol may be present;

means for detecting light reflected back from the target surface;

means for providing a detection signal corresponding to the timing and strength of changes in the amplitude of the reflected light; and means for filtering the detection signal wherein the means for filtering has a generally Gaussian transfer function that is selected to correct the shape of the light beam at distances close to the exit window, a size of the means for filtering selected as a function of a width of the light beam.

28. The apparatus of claim 27 wherein the means for filtering is a low pass filter.

29. The apparatus of claim 27 comprising means for sampling the detection signal and means for eliminating samples from the signal according to a given transfer function to smooth the detection signal.

* * * * *